(12) United States Patent
Kobrsi

(10) Patent No.: US 10,192,463 B2
(45) Date of Patent: Jan. 29, 2019

(54) CHIRALITY TEACHING TOOL AND METHOD OF USING SAME

(71) Applicant: Issam Kobrsi, Novi, MI (US)

(72) Inventor: Issam Kobrsi, Novi, MI (US)

( * ) Notice: Subject to any disclaimer, the term of this patent is extended or adjusted under 35 U.S.C. 154(b) by 211 days.

(21) Appl. No.: 15/411,033

(22) Filed: Jan. 20, 2017

(65) Prior Publication Data

US 2017/0169731 A1 Jun. 15, 2017

(51) Int. Cl.
*G09B 23/26* (2006.01)
*G09B 23/24* (2006.01)

(52) U.S. Cl.
CPC .................... *G09B 23/24* (2013.01)

(58) Field of Classification Search
CPC ................ G09B 23/24; G09B 23/26
See application file for complete search history.

(56) References Cited

U.S. PATENT DOCUMENTS

| | | | | | |
|---|---|---|---|---|---|
| 2,308,402 | A | * | 1/1943 | Taylor | G09B 23/26 434/278 |
| 3,604,130 | A | * | 9/1971 | Forsstrom | G09B 23/26 434/278 |
| 3,902,270 | A | * | 9/1975 | Molenaar | A63H 33/088 206/504 |
| 4,030,209 | A | * | 6/1977 | Dreiding | G09B 23/26 403/166 |
| 4,325,698 | A | * | 4/1982 | Darling | G09B 23/26 403/207 |
| 4,622,014 | A | * | 11/1986 | Mikelsaar | G09B 23/26 434/278 |
| 4,702,702 | A | * | 10/1987 | Mikelsaar | G09B 23/26 434/278 |
| 5,318,470 | A | * | 6/1994 | Denny | A63H 33/10 446/126 |
| 2015/0017624 | A1 | * | 1/2015 | Drapela | G09B 23/26 434/278 |

* cited by examiner

*Primary Examiner* — James S McClellan
(74) *Attorney, Agent, or Firm* — Cantor Colburn LLP

(57) ABSTRACT

A chirality teaching tool includes a central sphere representing a chiral carbon atom, and four projections representing substituents bound to the chiral carbon atom. The central sphere includes two hemispheres rotatable relative to each other. Each of the four projections forms an angle of about 100 to about 120 degrees with each other projection on the same hemisphere, and each projection is capable of forming an angle of about 100 to about 120 degrees with each of the two projections on the other hemisphere. A message indicating the type of chirality (e.g., "R" or "S") is visible from outside the central sphere and displayed on or below the outer surface of the central sphere. The message changes when relative locations of two of the four projections are exchanged by the rotation of the two hemispheres 180 degrees relative to each other.

16 Claims, 3 Drawing Sheets

CHIRALITY TEACHING TOOL AND METHOD OF USING SAME

BACKGROUND OF THE INVENTION

A chiral molecule is a molecule that cannot be superimposed on its mirror image. Learning about chirality is often challenging for organic chemistry students, because they must learn to create a mental picture of a three-dimensional molecule, or to depict a three-dimensional molecule in two dimensions using special symbols to indicate chemical bonds that project forward from or back from the plane of the two-dimensional page. It would be helpful for students to have additional tools to represent chiral molecules and to learn about the concept of chirality. In particular, it would be helpful for students to have a three dimensional teaching tool capable of adopting and identifying different chiral configurations.

BRIEF SUMMARY OF EMBODIMENTS OF THE INVENTION

One embodiment is a chirality teaching tool [1], comprising: (a) a central sphere [10] comprising an outer surface [12] and two hemispheres [14, 16] rotatable relative to each other; (b) four projections [20], two of the four projections [20] projecting from the outer surface [12] of each of the two hemispheres [14, 16], each projection having a central axis [22], the central axis having a point of contact [24] with the outer surface [12], each projection [20] extending linearly from the outer surface [12] and perpendicular to a plane [18] tangent to its central axis's [22] point of contact [24], each projection forming an angle of about 100 to about 120 degrees with the other projection [20] on the same hemisphere, and each projection being capable of forming an angle of about 100 to about 120 degrees with each of the two projections [20] on the other hemisphere; and (c) a message [30] visible from outside the central sphere [10] and displayed on or below the outer surface [12] of the central sphere [10], the message residing within an area [34] of the outer surface [12], the area bounded by three arcs on the outer surface, the arcs collectively joining the points of contact [24] associated with the central axes [22] of three of the four projections [20]; wherein two of the four projections [20] have relative locations that can be exchanged by rotation of one of the two hemispheres [14] 180 degrees relative to the other hemisphere [16], the rotation occurring about a rotation axis [40] through the central sphere [10], the rotation axis [40] defined by a line joining a first axis point [42] and a second axis point [44], the first axis point being on one hemisphere [14] and being a midpoint of an arc [46] on outer surface [12] joining the two points of contact [24] on the hemisphere, and the second axis point [44] being on the other hemisphere [16] and being a midpoint of an arc [48] on outer surface [12] and joining the two points of contact [24] on the other hemisphere; and wherein the message [30] changes when relative locations of two of the four projections [20] are exchanged by the rotation of the two hemispheres [14, 16] 180 degrees relative to each other.

Another embodiment is a method for teaching and/or learning chirality, the method comprising using the chirality teaching tool of claim 1.

Another embodiment is a method for teaching and/or learning chirality, the method comprising: assigning a unique priority number of 1, 2, 3, or 4 to each of four substituents attached to a chiral carbon atom, matching the priority numbers of the four substituents to the labels of the four projections of the chirality teaching tool of claim 1, and reading the chirality of the molecule from the message visible from outside the central sphere and displayed on or below the outer surface of the central sphere of the chirality teaching tool.

These and other embodiments are described in detail below.

BRIEF DESCRIPTION OF THE DRAWINGS

In the drawings, like elements are numbered alike in several FIGURES.

DETAILED DESCRIPTION OF THE INVENTION

The present inventor has determined that student learning about the concept of chirality is facilitated by a three-dimensional teaching tool that allows the student to reproduce a chiral stereochemical configuration about carbon and determine whether the chiral configuration is "R" or "S" in nature.

One embodiment is a chirality teaching tool [1], comprising: (a) a central sphere [10] comprising an outer surface [12] and two hemispheres [14, 16] rotatable relative to each other; (b) four projections [20], two of the four projections [20] projecting from the outer surface [12] of each of the two hemispheres [14, 16], each projection having a central axis [22], the central axis having a point of contact [24] with the outer surface [12], each projection [20] extending linearly from the outer surface [12] and perpendicular to a plane [18] tangent to its central axis's [22] point of contact [24], each projection forming an angle of about 100 to about 120 degrees with the other projection [20] on the same hemisphere, and each projection being capable of forming an angle of about 100 to about 120 degrees with each of the two projections [20] on the other hemisphere; and (c) a message [30] visible from outside the central sphere [10] and displayed on or below the outer surface [12] of the central sphere [10], the message residing within an area [34] of the outer surface [12], the area bounded by three arcs on the outer surface, the arcs collectively joining the points of contact [24] associated with the central axes [22] of three of the four projections [20]; wherein two of the four projections [20] have relative locations that can be exchanged by rotation of one of the two hemispheres [14] 180 degrees relative to the other hemisphere [16], the rotation occurring about a rotation axis [40] through the central sphere [10], the rotation axis [40] defined by a line joining a first axis point [42] and a second axis point [44], the first axis point being on one hemisphere [14] and being a midpoint of an arc [46] on outer surface [12] joining the two points of contact [24] on the hemisphere, and the second axis point [44] being on the other hemisphere [16] and being a midpoint of an arc [48] on outer surface [12] and joining the two points of contact [24] on the other hemisphere; and wherein the message [30] changes when relative locations of two of the four projections [20] are exchanged by the rotation of the two hemispheres [14, 16] 180 degrees relative to each other. In other words, the first axis point is the apex of the first hemisphere, and the second axis point is the apex of the second hemisphere.

Figure 1:
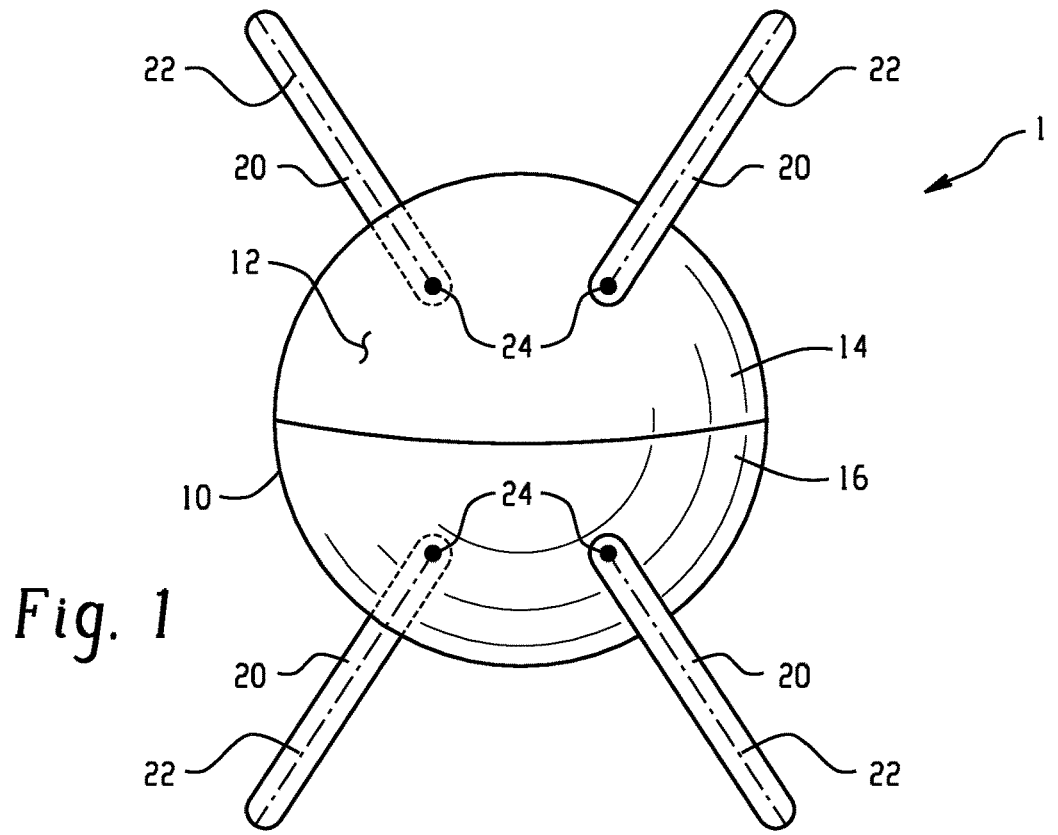
FIG. 1 is a view of chirality teaching tool [1], which includes central sphere [10] comprising an outer surface [12] and two hemispheres [14, 16] rotatable relative to each other; the chirality teaching tool [1] further includes four projections [20]; two of the four projections [20] project from the outer surface [12] of each of the two hemispheres [14, 16]; each projection forms an angle of about 100 to about 120 degrees with the other projection [20] on the same hemisphere, and each projection is capable of forming an angle of about 100 to about 120 degrees with each of the two projections [20] on the other hemisphere; each projection [20] has a central axis [22], the central axis having a point of contact [24] with the outer surface [12]; two of the four projections [20] have relative locations that can be exchanged by rotation of one of the two hemispheres [14] 180 degrees relative to the other hemisphere [16].

FIG. 1 is a view of chirality teaching tool [1], which includes central sphere [10] comprising an outer surface [12] and two hemispheres [14, 16] rotatable relative to each other; the chirality teaching tool [1] further includes four projections [20]; two of the four projections [20] project from the outer surface [12] of each of the two hemispheres [14, 16]; each projection forms an angle of about 100 to about 120 degrees with the other projection [20] on the same hemisphere, and each projection is capable of forming an angle of about 100 to about 120 degrees with each of the two projections [20] on the other hemisphere; each projection [20] has a central axis [22], the central axis having a point of contact [24] with the outer surface [12]; two of the four projections [20] have relative locations that can be exchanged by rotation of one of the two hemispheres [14] 180 degrees relative to the other hemisphere [16].

Figure 2:
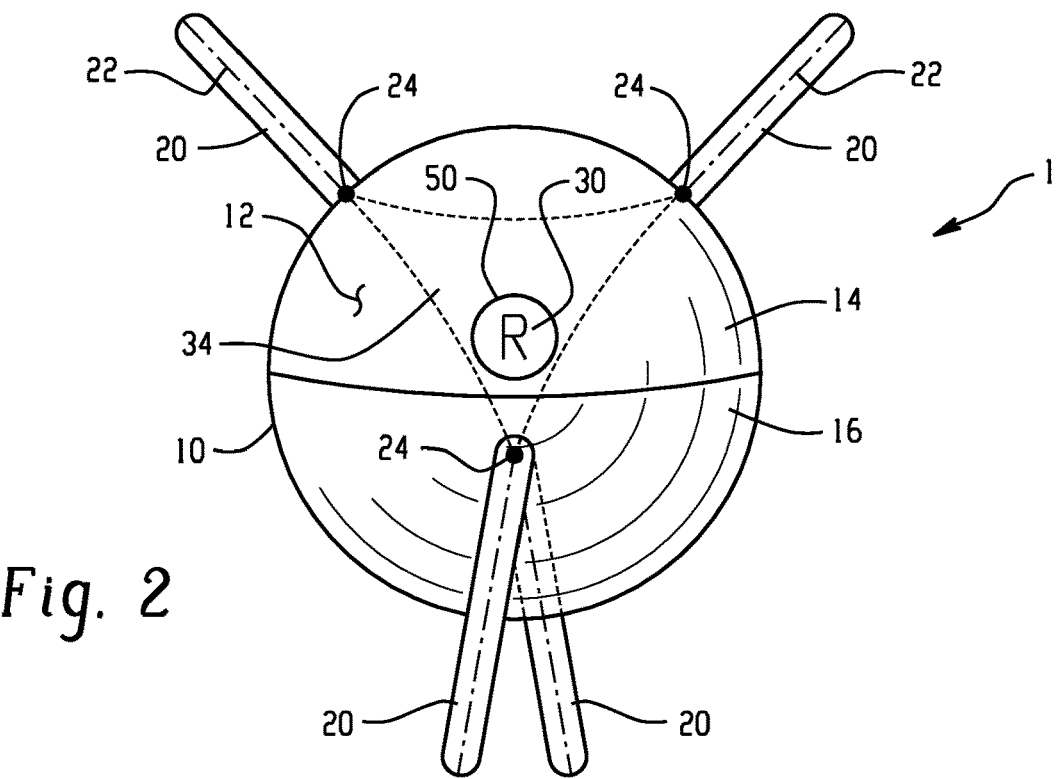
FIG. 2 is another view of chirality teaching tool [1], which, relative to FIG. 1, further illustrates that a message [30] visible from outside the central sphere [10] and displayed on or below the outer surface [12] of the central sphere [10], the message being within an opening [50], the opening [50] being within an area [34] of the outer surface [12], the area bounded by three arcs on the outer surface, the arcs collectively joining the points of contact [24] associated with the central axes [22] of three of the four projections [20].

FIG. 2 is another view of chirality teaching tool [1], which, relative to FIG. 1, further illustrates that a message [30] visible from outside the central sphere [10] and displayed on or below the outer surface [12] of the central sphere [10], the message being within an opening [50], the opening [50] being within an area [34] of the outer surface [12], the area bounded by three arcs on the outer surface, the arcs collectively joining the points of contact [24] associated with the central axes [22] of three of the four projections [20].

Figure 3:
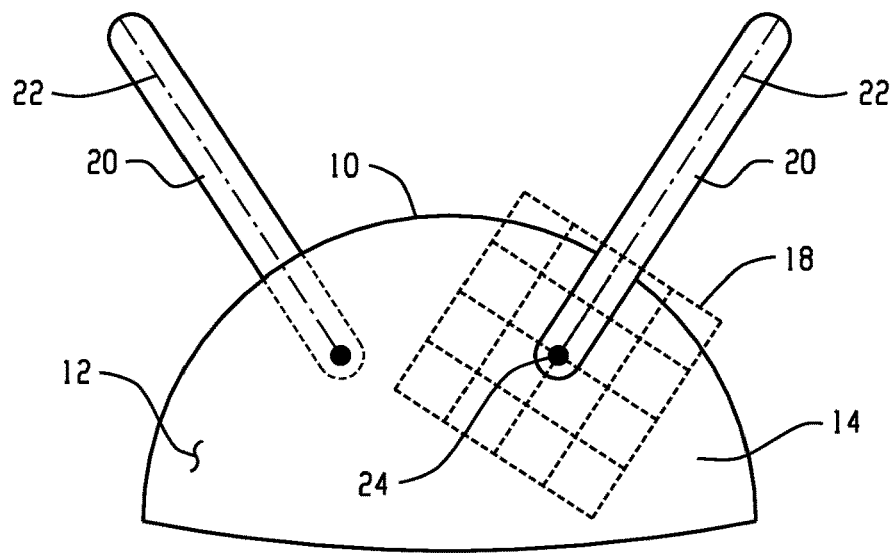
FIG. 3 illustrates a first hemisphere [14], in which a projection [20] has a central axis [22] having a point of contact [24] with the outer surface [12]; a plane [18] intersects point of contact [24] and is tangent to the outer surface [12].

FIG. 3 illustrates a first hemisphere [14], in which a projection [20] has a central axis [22] having a point of contact [24] with the outer surface [12]; a plane [18] intersects point of contact [24] and is tangent to the outer surface [12].

Figure 4:
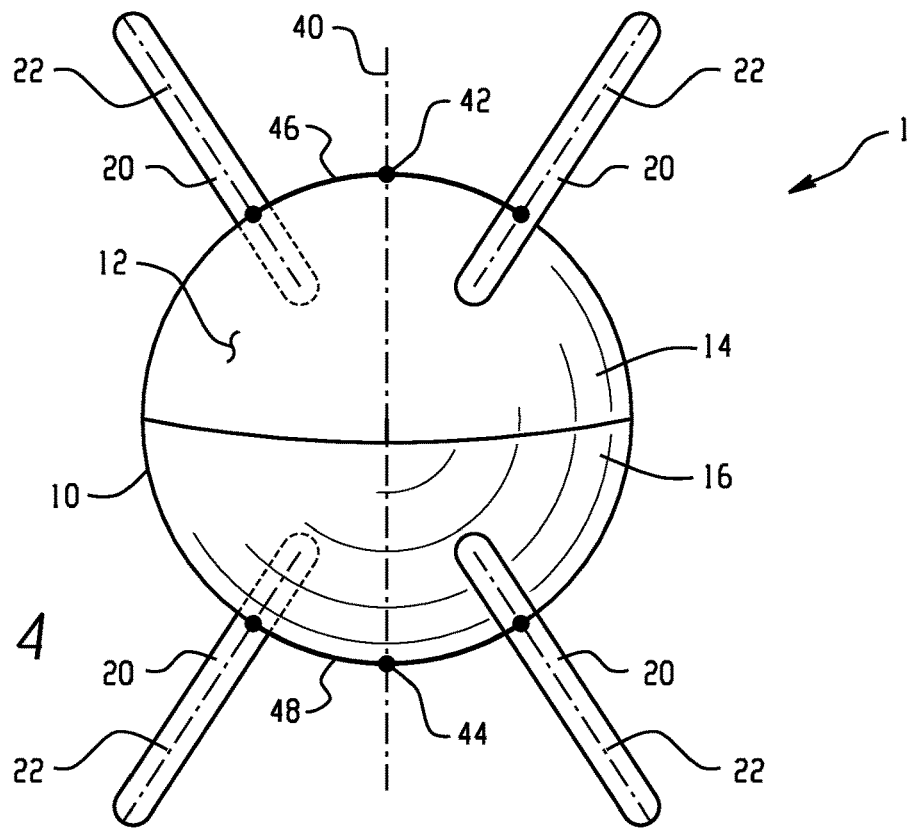
FIG. 4 is another view of chirality teaching tool [1], which, relative to FIGS. 1 and 2, illustrates rotation axis [40] through the central sphere [10], the rotation axis [40] defined by a line joining a first axis point [42] and a second axis point [44], the first axis point being on one hemisphere [14] and being a midpoint of an arc [46] on outer surface [12] joining the two points of contact [24] on the hemisphere, and the second axis point [44] being on the other hemisphere [16] and being a midpoint of an arc [48] on outer surface [12] and joining the two points of contact [24] on the other hemisphere.

FIG. 4 is another view of chirality teaching tool [1], which, relative to FIGS. 1 and 2, illustrates rotation axis [40] through the central sphere [10], the rotation axis [40] defined by a line joining a first axis point [42] and a second axis point [44], the first axis point being on one hemisphere [14] and being a midpoint of an arc [46] on outer surface [12] joining the two points of contact [24] on the hemisphere, and the second axis point [44] being on the other hemisphere [16] and being a midpoint of an arc [48] on outer surface [12] and joining the two points of contact [24] on the other hemisphere.

In some embodiments, the central sphere [10] has a diameter, and each projection extends a length of 0.5 to 4 diameters from its point of contact [24] with the central sphere [10] and away from the central sphere [10].

In some embodiments, each of the four projections [20] is uniquely labelled to represent the priority of one of the four unique substituents about a central carbon atom, represented by the central sphere [10]. The concept of assigning priority to substituents bonded to carbon is well known in organic chemistry and need not be elaborated here. In some embodiments, each of the four projections [20] is uniquely labelled "1", "2", "3", or "4", with "1" representing the highest priority substituent, and "4" representing the lowest priority substituent.

There is no particular limitation on the material used to form the chirality teaching tool [1] and its parts. Suitable materials include, for example, plastic, wood, metal, a composite, an alloy, or a combination thereof.

In some embodiments, each projection [20] independently comprises a shape selected from the group consisting of a cylinder, a cone, a triangular prism, a rectangular prism, a sphere, or a portion of a sphere. Each projection [20] can have the same dimensions. Alternatively, at least one of the four projections [20] can have different dimensions than at least one of the other three projections [20]. For example, the lowest priority substituent can protrude the shortest distance from the central sphere [10].

In some embodiments, each of the four projections [20] independently extends a length of about 1 to about 10 centimeters from the outer surface of the central sphere [10]. Within these embodiments, each of the projections can defines a cross-sectional area about its point of contact with the outer surface, and the cross-sectional area can have at least one dimension of about 0.1 to about 1 centimeter.

In some embodiments, each of the hemispheres [14, 16] of the chirality teaching tool [1] comprises plastic, wood, metal, a composite, an alloy, or a combination thereof.

In the chirality teaching tool [1], each projection [20] is preferably capable of forming an angle with each of the other three projections of about 109.5 degrees, thereby approximating the geometry of tetrahedral carbon.

In some embodiments of chirality teaching tool [1], the message [30] is one of two distinct messages (e.g., "R" or "S"), representing either an R-enantiomer or an S-enantiomer.

In some embodiments, the central sphere [10] is hollow, having a surface thickness of about 0.1 to about 5 millimeters.

Figure 5:
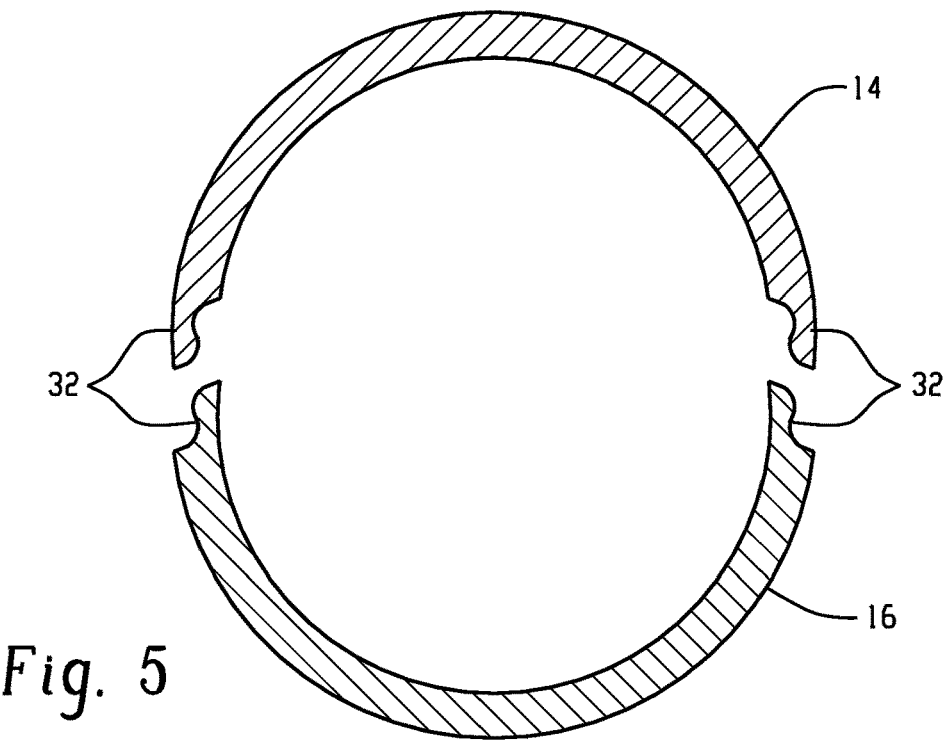
FIG. 5 is a cross-sectional view of two hemispheres [14, 16], each hemisphere having two joint parts [32] capable of joining the two hemispheres [14, 16] in a snap fit.

In some embodiments, the two hemispheres [14, 16] are joined via a snap fit. FIG. 5 is a cross-sectional view of two hemispheres [14, 16], each hemisphere having two joint parts [32] capable of joining the two hemispheres [14, 16] in a snap fit.

In some embodiments, the two hemispheres [14, 16] are adapted to stabilize two configurations in which each projection [20] forms an angle of about 100 to about 120 degrees with each other projection [20].

In a very specific embodiment of the chirality teaching tool [1], the two hemispheres [14, 16] are joined via a snap fit; the two hemispheres [14, 16] correspond to a message-containing hemisphere [14] and a non-message-containing hemisphere [16]; the non-message-containing hemisphere [17] comprises an outer surface defining an opening [50] that allows a message to be seen on a surface of the message-containing hemisphere [15], the message-containing hemisphere [15] comprises a skirt [52] protruding inwardly relative to the outer surface [12] of the message-containing hemisphere [14], the skirt comprising a message [30] capable of being displayed through the opening [50] of the non-message-containing hemisphere [17], the message comprising the letter "R" or the letter "S".

Figure 6:
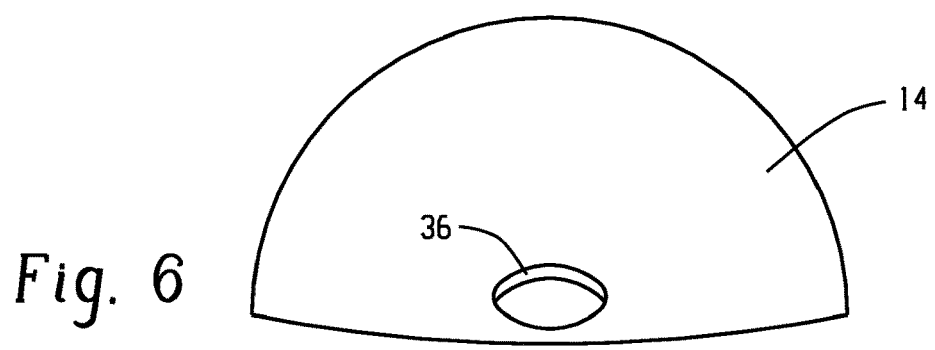
FIG. 6 is a perspective view of a first hemisphere [14] comprising a window [36] through which a message [30] on the other hemisphere [16] can be viewed.

FIG. 6 is a perspective view of a first hemisphere [14] comprising a window [36] through which a message [30] on the other hemisphere [16] can be viewed.

Figure 7:
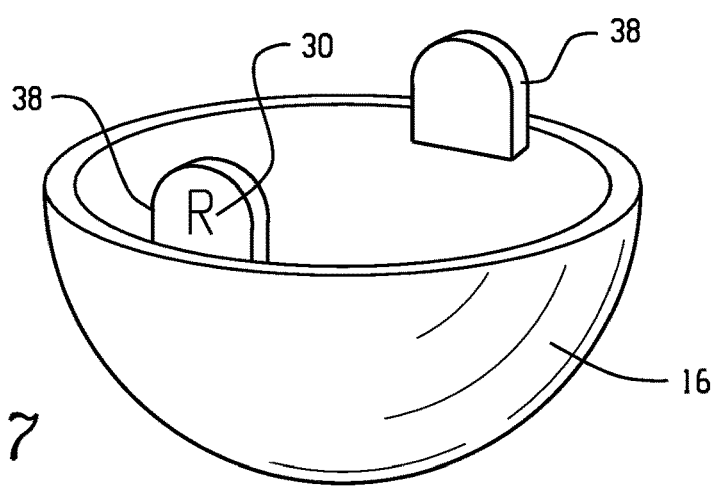
FIG. 7 is a perspective view of a second hemisphere [16] comprising two message tabs [38], each capable of displaying a message [30] through a window [36] on the other hemisphere [14]. The message tabs [38] are recessed relative to the outer surface [12] of second hemisphere [16].

FIG. 7 is a perspective view of a second hemisphere [16] comprising two message tabs [38], each capable of displaying a message [30] through a window [36] on the other hemisphere [14]. The message tabs [38] are recessed relative to the outer surface [12] of second hemisphere [16].

In some embodiments, each of the four projections [20] is uniquely and sensorially (e.g., visually, tactilely (for the sight-impaired)) associated with the number 1, 2, 3, or 4.

In some embodiments, each projection [20] comprises a terminal sphere, with the four terminal spheres comprising a first terminal sphere labelled "1" and having a first diameter less than the diameter of the central sphere, a second terminal sphere labelled "2" and having a second diameter less than the first diameter, a third terminal sphere labelled "3" and having a third diameter less than the second diameter, and a fourth terminal sphere labelled "4" and having a fourth diameter less than the third diameter.

Another embodiment is a method for teaching and/or learning chirality, the method comprising using the chirality teaching tool [1].

Another embodiment is a method for teaching and/or learning chirality, the method comprising: assigning a unique priority number of 1, 2, 3, or 4 to each of four substituents attached to a chiral carbon atom, matching the priority numbers of the four substituents to the labels of the four projections of the chirality teaching tool [1], and reading the chirality of the molecule from the message visible from outside the central sphere and displayed on or below the outer surface of the central sphere of the chirality teaching tool.

The invention includes at least the following embodiments.

Embodiment 1: A chirality teaching tool [1], comprising: (a) a central sphere [10] comprising an outer surface [12] and two hemispheres [14, 16] rotatable relative to each other; (b) four projections [20], two of the four projections [20] projecting from the outer surface [12] of each of the two hemispheres [14, 16], each projection having a central axis [22], the central axis having a point of contact [24] with the outer surface [12], each projection [20] extending linearly from the outer surface [12] and perpendicular to a plane [18] tangent to its central axis's [22] point of contact [24], each projection forming an angle of about 100 to about 120 degrees with the other projection [20] on the same hemisphere, and each projection being capable of forming an angle of about 100 to about 120 degrees with each of the two projections [20] on the other hemisphere; and (c) a message [30] visible from outside the central sphere [10] and displayed on or below the outer surface [12] of the central sphere [10], the message residing within an area [34] of the outer surface [12], the area bounded by three arcs on the outer surface, the arcs collectively joining the points of contact [24] associated with the central axes [22] of three of the four projections [20]; wherein two of the four projections [20] have relative locations that can be exchanged by rotation of one of the two hemispheres [14] 180 degrees relative to the other hemisphere [16], the rotation occurring about a rotation axis [40] through the central sphere [10], the rotation axis [40] defined by a line joining a first axis point [42] and a second axis point [44], the first axis point being on one hemisphere [14] and being a midpoint of an arc [46] on outer surface [12] joining the two points of contact [24] on the hemisphere, and the second axis point [44] being on the other hemisphere [16] and being a midpoint of an arc [48] on outer surface [12] and joining the two points of contact [24] on the other hemisphere; and wherein the message [30] changes when relative locations of two of the four projections [20] are exchanged by the rotation of the two hemispheres [14, 16] 180 degrees relative to each other.

Embodiment 2: The chirality teaching tool [1] of Embodiment 1, wherein the central sphere [10] has a diameter, and wherein each projection extends a length of 0.5 to 4 diameters from its point of contact [24] with the central sphere [10] and away from the central sphere [10].

Embodiment 3: The chirality teaching tool [1] of Embodiment 1 or 2, wherein each of the four projections [20] is uniquely labelled to represent the priority of one of the four unique substituents about a central carbon atom, represented by the central sphere [10].

Embodiment 4: The chirality teaching tool [1] of any one of Embodiments 1-3, wherein each of the projections [20] independently comprises plastic, wood, metal, a composite, an alloy, or a combination thereof.

Embodiment 5: The chirality teaching tool [1] of any one of Embodiments 1-4, wherein each projection [20] independently comprises a shape selected from the group consisting of a cylinder, a cone, a triangular prism, a rectangular prism, a sphere, or a portion of a sphere.

Embodiment 6: The chirality teaching tool [1] of any one of Embodiments 1-5, wherein each projection [20] has the same dimensions.

Embodiment 7: The chirality teaching tool [1] of any one of Embodiments 1-5, wherein at least one of the four projections [20] has different dimensions than at least one of the other three projections [20].

Embodiment 8: The chirality teaching tool [1] of any one of Embodiments 1-7, wherein each of the hemispheres [14, 16] comprises plastic, wood, metal, a composite, an alloy, or a combination thereof.

Embodiment 9: The chirality teaching tool [1] of any one of Embodiments 1-8, wherein each projection [20] is capable of forming an angle with each of the other three projections of about 109.5 degrees.

Embodiment 10: The chirality teaching tool [1] of any one of Embodiments 1-9, wherein the message [30] is one of two distinct messages, representing either an R-stereoisomer or an S-stereoisomer.

Embodiment 11: The chirality teaching tool [1] of any one of Embodiments 1-10, wherein the two hemispheres [14, 16] are joined via a snap fit.

Embodiment 12: The chirality teaching tool [1] of any one of Embodiments 1-11, wherein the two hemispheres [14, 16] are adapted to stabilize two configurations in which each projection [20] forms an angle of about 100 to about 120 degrees with each other projection [20].

Embodiment 13: The chirality teaching tool [1] of Embodiment 1, wherein the two hemispheres [14, 16] are joined via a snap fit; wherein the two hemispheres [14, 16] correspond to a message-containing hemisphere [14] and a non-message-containing hemisphere [16]; wherein the non-message-containing hemisphere [17] comprises an outer surface defining an opening [50] that allows a message to be seen on a surface of the message-containing hemisphere [15], wherein the message-containing hemisphere [15] comprises a skirt [52] protruding inwardly relative to the outer surface [12] of the message-containing hemisphere [14], the skirt comprising a message [30] capable of being displayed through the opening [50] of the non-message-containing hemisphere [17], the message comprising the letter "R" or the letter "S".

Embodiment 14: The chirality teaching tool [1] of any one of Embodiments 1-13, wherein each of the four projections [20] is uniquely and sensorially associated with the number 1, 2, 3, or 4.

Embodiment 15: A method for teaching and/or learning chirality, the method comprising using the chirality teaching tool of Embodiment 1.

Embodiment 16: A method for teaching and/or learning chirality, the method comprising: assigning a unique priority number of 1, 2, 3, or 4 to each of four substituents attached to a chiral carbon atom, matching the priority numbers of the four substituents to the labels of the four projections of the chirality teaching tool of claim 1, and reading the chirality of the molecule from the message visible from outside the central sphere and displayed on or below the outer surface of the central sphere of the chirality teaching tool.

All ranges disclosed herein are inclusive of the endpoints, and the endpoints are independently combinable with each other. Each range disclosed herein constitutes a disclosure of any point or sub-range lying within the disclosed range.

The invention claimed is:

1. A chirality teaching tool [1], comprising:
   (a) a central sphere [10] comprising an outer surface [12] and two hemispheres [14, 16] rotatable relative to each other;
   (b) four projections [20], two of the four projections [20] projecting from the outer surface [12] of each of the two hemispheres [14, 16], each projection having a central axis [22], the central axis having a point of contact [24] with the outer surface [12], each projection [20] extending linearly from the outer surface [12] and perpendicular to a plane [18] tangent to its central axis's [22] point of contact [24], each projection forming an angle of about 100 to about 120 degrees with the other projection [20] on the same hemisphere, and each projection being capable of forming an angle of about 100 to about 120 degrees with each of the two projections [20] on the other hemisphere; and
   (c) a message [30] visible from outside the central sphere [10] and displayed on or below the outer surface [12] of the central sphere [10], the message residing within an area [34] of the outer surface [12], the area bounded by three arcs on the outer surface, the arcs collectively joining the points of contact [24] associated with the central axes [22] of three of the four projections [20];
   wherein two of the four projections [20] have relative locations that can be exchanged by rotation of one of the two hemispheres [14] 180 degrees relative to the other hemisphere [16], the rotation occurring about a rotation axis [40] through the central sphere [10], the rotation axis [40] defined by a line joining a first axis point [42] and a second axis point [44], the first axis point being on one hemisphere [14] and being a midpoint of an arc [46] on outer surface [12] joining the two points of contact [24] on the hemisphere, and the second axis point [44] being on the other hemisphere [16] and being a midpoint of an arc [48] on outer surface [12] and joining the two points of contact [24] on the other hemisphere; and
   wherein the message [30] changes when relative locations of two of the four projections [20] are exchanged by the rotation of the two hemispheres [14, 16] 180 degrees relative to each other.

2. The chirality teaching tool [1] of claim 1, wherein the central sphere [10] has a diameter, and wherein each projection extends a length of 0.5 to 4 diameters from its point of contact [24] with the central sphere [10] and away from the central sphere [10].

3. The chirality teaching tool [1] of claim 1, wherein each of the four projections [20] is uniquely labelled to represent the priority of one of the four unique substituents about a central carbon atom, represented by the central sphere [10].

4. The chirality teaching tool [1] of claim 1, wherein each of the projections [20] independently comprises plastic, wood, metal, a composite, an alloy, or a combination thereof.

5. The chirality teaching tool [1] of claim 1, wherein each projection [20] independently comprises a shape selected from the group consisting of a cylinder, a cone, a triangular prism, a rectangular prism, a sphere, or a portion of a sphere.

6. The chirality teaching tool [1] of claim 1, wherein each projection [20] has the same dimensions.

7. The chirality teaching tool [1] of claim 1, wherein at least one of the four projections [20] has different dimensions than at least one of the other three projections [20].

8. The chirality teaching tool [1] of claim 1, wherein each of the hemispheres [14, 16] comprises plastic, wood, metal, a composite, an alloy, or a combination thereof.

9. The chirality teaching tool [1] of claim 1, wherein each projection [20] is capable of forming an angle with each of the other three projections of about 109.5 degrees.

10. The chirality teaching tool [1] of claim 1, wherein the message [30] is one of two distinct messages, representing either an R-stereoisomer or an S-stereoisomer.

11. The chirality teaching tool [1] of claim 1, wherein the two hemispheres [14, 16] are joined via a snap fit.

12. The chirality teaching tool [1] of claim 1, wherein the two hemispheres [14, 16] are adapted to stabilize two configurations in which each projection [20] forms an angle of about 100 to about 120 degrees with each other projection [20].

13. The chirality teaching tool [1] of claim 1, wherein the two hemispheres [14, 16] are joined via a snap fit;

wherein the two hemispheres [14, 16] correspond to a message-containing hemisphere [14] and a non-message-containing hemisphere [16];

wherein the non-message-containing hemisphere [17] comprises an outer surface defining an opening [50] that allows a message to be seen on a surface of the message-containing hemisphere [15], wherein the message-containing hemisphere [15] comprises a skirt [52] protruding inwardly relative to the outer surface [12] of the message-containing hemisphere [14], the skirt comprising a message [30] capable of being displayed through the opening [50] of the non-message-containing hemisphere [17], the message comprising the letter "R" or the letter "S".

14. The chirality teaching tool [1] of claim 1, wherein each of the four projections [20] is uniquely and sensorially associated with the number 1, 2, 3, or 4.

15. A method for teaching and/or learning chirality, the method comprising using the chirality teaching tool of claim 1.

16. A method for teaching and/or learning chirality, the method comprising:
assigning a unique priority number of 1, 2, 3, or 4 to each of four substituents attached to a chiral carbon atom,
matching the priority numbers of the four substituents to the labels of the four projections of the chirality teaching tool of claim 1, and
reading the chirality of the molecule from the message visible from outside the central sphere and displayed on or below the outer surface of the central sphere of the chirality teaching tool.

* * * * *